United States Patent
Luna et al.

(10) Patent No.: US 7,099,917 B2
(45) Date of Patent: Aug. 29, 2006

(54) METHOD OF PROVIDING A PROXY SERVER BASED SERVICE TO A COMMUNICATIONS DEVICE ON A NETWORK

(75) Inventors: Michael E. S. Luna, Dublin, CA (US); James Clarke, Banbridge (IE)

(73) Assignee: Openwave Systems Inc., Redwood City, CA (US)

( * ) Notice: Subject to any disclaimer, the term of this patent is extended or adjusted under 35 U.S.C. 154(b) by 766 days.

(21) Appl. No.: 09/838,077

(22) Filed: Apr. 18, 2001

(65) Prior Publication Data

US 2002/0169847 A1 Nov. 14, 2002

(51) Int. Cl.
*G06F 15/16* (2006.01)

(52) U.S. Cl. .................................. 709/203; 709/218
(58) Field of Classification Search ............... 709/225, 709/227–229, 230, 206, 217–219, 201–203
See application file for complete search history.

(56) References Cited

U.S. PATENT DOCUMENTS

| | | | |
|---|---|---|---|
| 6,275,693 B1 * | 8/2001 | Lin et al. ............... | 455/414.3 |
| 6,590,588 B1 * | 7/2003 | Lincke et al. ........... | 709/218 |
| 6,678,731 B1 * | 1/2004 | Howard et al. .......... | 709/225 |
| 6,775,536 B1 * | 8/2004 | Geiger et al. ........... | 455/411 |

FOREIGN PATENT DOCUMENTS

| | | |
|---|---|---|
| FR | 2 799 594 A1 | 4/2001 |
| GB | 2353919 A | 3/2001 |
| WO | WO 00/02358 A1 | 1/2000 |

OTHER PUBLICATIONS

Fox, Armando et al., "Security on the Move: Indirect Authentication Using Kerberos", MOBICOM 96, Proceedings, ACM, pp. 155–164.*

* cited by examiner

*Primary Examiner*—Saleh Najjar
*Assistant Examiner*—David Lazaro
(74) *Attorney, Agent, or Firm*—Blakely, Sokoloff, Taylor & Zafman LLP (57) ABSTRACT

The invention provides a method of using a communications device to access an on-line service provided by a network server. In one embodiment of the invention, a mobile telephone is used to establish a connection with a proxy server. The mobile telephone is then used to establish a second connection with a network server on which hypermedia information is stored. The second connection is a secure end-to-end connection which may be achieved by either tunneling through the proxy server or by bypassing it entirely. The second connection is used to send a secure request for hypermedia information to the network server. If it is determined that, in order to service the request, additional information is required, then the mobile telephone is notified and a service capable of providing the additional information is accessed remotely in the proxy server by sending a communication to the proxy server via the first connection.

10 Claims, 10 Drawing Sheets

METHOD OF PROVIDING A PROXY SERVER BASED SERVICE TO A COMMUNICATIONS DEVICE ON A NETWORK

FIELD OF THE INVENTION

This invention relates to communications over a network. In particular it relates to a method of providing a proxy based service to a wireless communications device on a network.

BACKGROUND

Mobile communications devices, such as mobile telephones, two-way pagers, Personal Digital Assistant (PDAs), Personal Information Managers (PIMs), and other hand-held computing devices have become very popular. In many cases these mobile communications devices are used as entry points into the Internet and intranets.

A problem common to many conventional mobile communication devices is that these devices are characterized by severe limitations in processing power, memory size, display size and the size of the buttons or keys by which a user can input request to, view and manipulate information obtained from a network server. Furthermore, the bandwidth of the communications channels connecting these mobile devices to a network server e.g. a hypermedia server on the Internet, is also severely limited.

One attempt to overcome these limitations of current mobile devices is to make use of a proxy server to facilitate communications between the various communications devices and a network server, the role of the proxy server being to provide an interface between the wireless network on which the communications devices operate and the (wired) network on which the network server operates. The proxy server may also be used to provide value added services to the mobile communications devices. The proxy servers are implemented as network server devices having hardware and software components which allow the proxy server to provide services to the mobile communications devices. For example, a proxy server can be used to provide bookmarks, cookie caches, implementation of privacy agreements, sub-id translations, location information, presence information, etc. to a mobile communications device. However, in order for the proxy server to provide these services, it is necessary for the proxy server to be able to access communications or requests from the mobile communications device to the network server and specifically, to have knowledge of the content of such requests.

It is desirable to provide end-to-end secure communications between the communications device and the network server, for various reasons. In the case of true end-to-end secure communications between the communications device and the network server, all requests are encrypted and tunneled through the proxy server. Alternatively, a secure connection may be achieved by bypassing the proxy server entirely. In both these scenarios, when a true end-to-end secure connection is established between the mobile communications device and the network server, the proxy server will not have knowledge of the content of requests by the mobile communications device to the network server. Consequently the proxy server will not be able to provide value-added services, such as those mentioned above, to the mobile communications device.

SUMMARY OF THE INVENTION

The invention provides a method of using a communications device to access an on-line service provided by a network server. The method comprises accessing a proxy server based service in order to obtain information required by the network server in order to process a request to access the on-line service. The information is then sent to the network server via a secure connection with the network server.

The invention also provides a method for a proxy server to provide a proxy server based service to a communications device. The method comprises receiving a request from the communications device to access the proxy server based service and processing the request. The result of the request is then sent to the communications device for forwarding to a network server via a secure connection previously established between the communications device and the network server.

BRIEF DESCRIPTION OF THE DRAWINGS

The present invention will now be described, by way of non-limiting example, with reference to the accompanying drawings in which.

DETAILED DESCRIPTION

Described herein is a method of using a communications device to access an on-line service provided by a network server. The method comprises accessing a proxy server based service in order to obtain information required by the network server in order to process a request to access the on-line service. The information is then sent to the network server via a secure connection with the network server.

A method for a proxy server to provide a proxy server based service to a communications device is also described. The method comprises receiving a request from the communications device to access the proxy server based service, processing the request and sending the result of the request to the communications device for forwarding to a network server. The result is sent via a secure connection previously established between the communications device and the network server.

Figure 1:
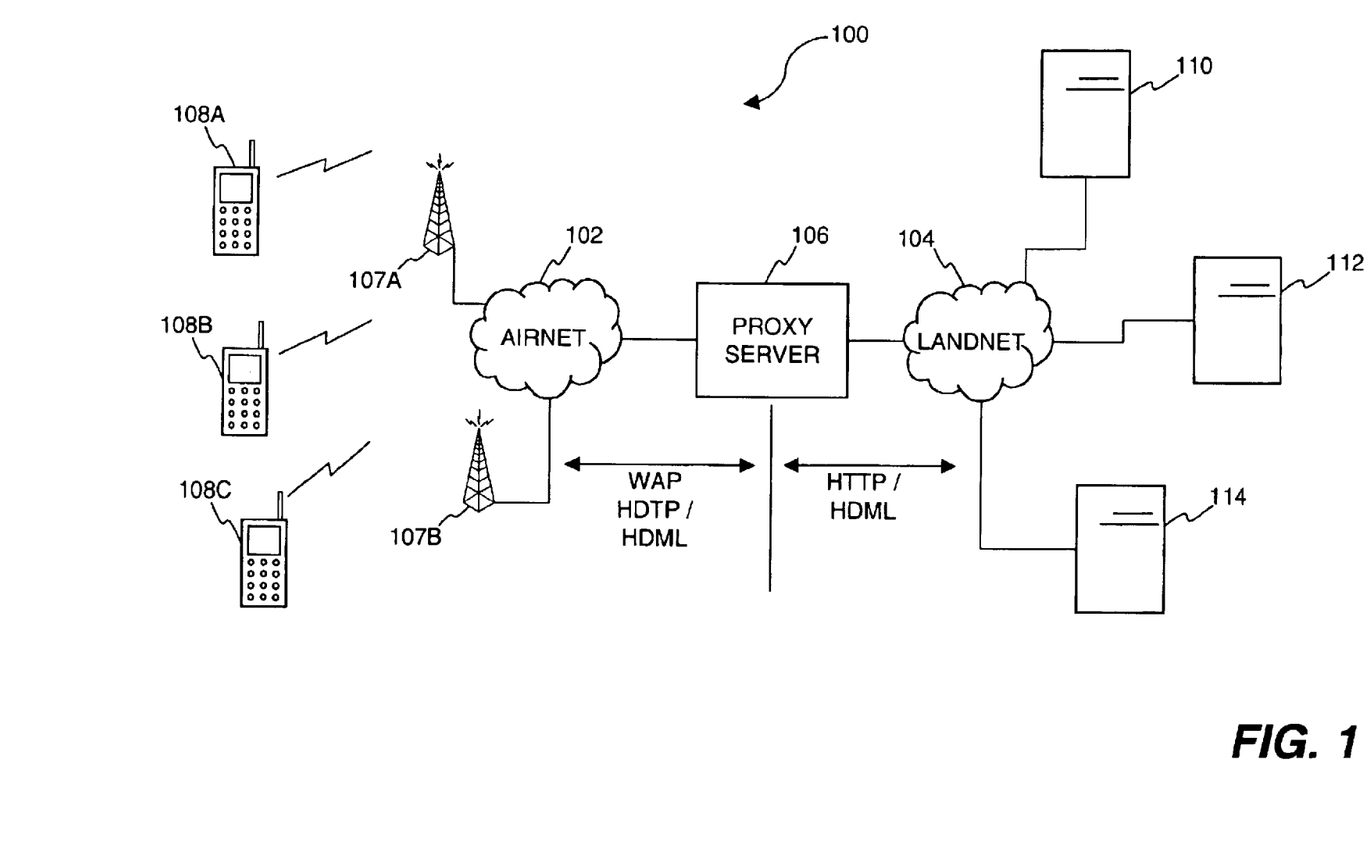
FIG. 1 shows a network environment in which the present invention may be practiced.

FIG. 1 shows an exemplary network environment 100 in which various embodiments of the present invention may be practiced. Network environment 100 includes a wireless network or airnet 102 that is coupled to a land based network or landnet 104 via a proxy server 106.

Landnet 104 may be or may include the Internet, an intranet or a data network such as a Local Area Network (LAN). The communications protocol supporting landnet 104 may be, for example, Transmission Control Protocol (TCP/IP), Hand-Held Transfer Protocol (HTTP), or secure HTTP (sHTTP).

Airnet 102 may, for example, be a network such as a Mobile Digital Packet Data (MDPD) network, a Global System for Mobile (GSM) network, a Code Division Multiple Access (CDMA) network, or a Time Division Multiple Access Network (TDMA) network. The communications protocol used by the airnet 102 may include, for example, Wireless Application Protocol (WAP) and/or Hand-Held Device Protocol (HDTP). Components of the airnet 102 include transceiver base stations 107A and 107B, each of which facilitate wireless communications within its respective cell. As shown, mobile communications devices 108A, 108B, 108C may operate within the area served by airnet 102.

Airnet 102 connects to landnet 104 via proxy server 106. Proxy server 106 serves to convert communications as they pass between airnet 102 and landnet 104 and thus functions as a gateway server. Coupled to the landnet 104 are network servers 110, 112, and 114, each of which supports communications with landnet 104. Each of the mobile communications devices 108A, 108B and 108C, are configured to retrieve remotely stored hypermedia information such as Wireless Mark-up Language (WML) documents, Hyper-text Mark-up Language (HTML) documents, Compact HTML (CHTML) documents, Extensible Mark-up Language (XML) documents, or Hand-Held Device Mark-up Language (HDML) documents from the network servers 110, 112 and 114.

Proxy server 106 supports communications according to HTTP on the landnet 104 side and communication according to HDTP and/or WAP on the airnet 102 side. Proxy server 106 also has software and/or hardware to provide various services to mobile communications devices 108A, 108B and 108C, as will be described in greater detail below.

Each network server 110, 112 and 114 may be a conventional network server having specialized software to carry out the methodology of the present invention, as will be described in greater detail below. In one embodiment, when landnet 104 is the Internet, each network server, 110, 112 and 114 may be implemented as a web server storing hypermedia information such as HTML documents.

The mobile communications devices 108A, 108B and 108C may be mobile telephones, 2-way pagers, Personal Digital Assistants, (PDAs), Personal Information Managers (PIMs), or any other hand-held computing device. For purposes of this description, it will be assumed that each of the mobile computing devices, 108A, 108B and 108C is a mobile telephone. An embodiment 150 of a mobile telephone that may be used to practice the present invention is described with reference to FIG. 5 of the drawings.

As discussed above, mobile telephone 150 has severe limitations in terms of processing power, memory size, display size, and the size of the buttons or keys by which a user can request, view, and manipulate information, such as hypermedia information stored on, for example, network server 114. These limitations, can be overcome in the prior art by using a proxy server to provide services to mobile telephone 150.

One example of such a service is a "bookmark" or "favorites" service. Conventional web browsers are able to access lists of frequently used hypermedia links, e.g. URLs, which are stored in memory. However, because of its limited storage capability, the mobile telephone 150 has insufficient storage to store such a list of frequently used hypermedia links. This severely reduces the usefulness of mobile telephone 150 for the purpose of, for example, browsing the world-wide-web. This limitation is overcome by providing a bookmark service, resident in the proxy server, which allows a user of mobile telephone 150 to store and access a list of frequently used hypermedia links in a memory device resident in the proxy server.

Another example of a service which a proxy server may provide to mobile telephone 150 is a "location" service. There are many web-based applications that require specific information relating to the location of a mobile communications device. For example, network server 114 may be used to provide location or map information to mobile telephone 150. In order to do this the exact location of the mobile telephone 150 must be sent to the network server 114. A proxy server may be used to provide the exact location of mobile telephone 150 to network server 114. In practice, a communication from the mobile telephone 150 requesting map information from network server 1 14 is first sent to the proxy server. The proxy server has specialized software, which is able to determine that the communication from mobile telephone 150 requires the location of mobile telephone 150 in order for network server 114 to provide the necessary information to mobile telephone 150. In response to a determination that location information is required, the proxy server is able to determine the location of mobile telephone 150 either by calculating the location itself or by accessing a remote server in order to provide this information. The proxy server thereafter enhances the communication from mobile telephone 150 by adding the location information thereto before forwarding the enhanced communications to network server 114 for processing.

However, as previously noted, it may be desirable to have an end-to-end secure connection between the mobile telephone 150 and the network server 114. In order to facilitate discussion of the invention, it is assumed that a user of mobile telephone 150 wishes to communicate with network server 114 via a secure end-to-end connection. Such a connection may be achieved by encrypting communications from mobile telephone 150 and tunneling it through proxy server 106. Alternatively, proxy server 106 may be bypassed entirely by routing the communications to another gateway server. The particular method used to achieve the end-to-end secure connection is not germane to the invention.

It will be appreciated that as a result of the secure end-to-end connection between mobile telephone 150 and network server 114, proxy server 106 is unable to access, and therefore enhance in the manner described above, a communication request from mobile telephone 150 to network server 114. For the same reason, proxy server 106 is unable to provide services, e.g. a bookmark service to mobile telephone 150.

The present invention provides a solution to this problem by allowing proxy server 106 to access communications or requests from mobile telephone 150 to network server 114 even in the presence of an end-to-end secure connection.

Figure 2A:
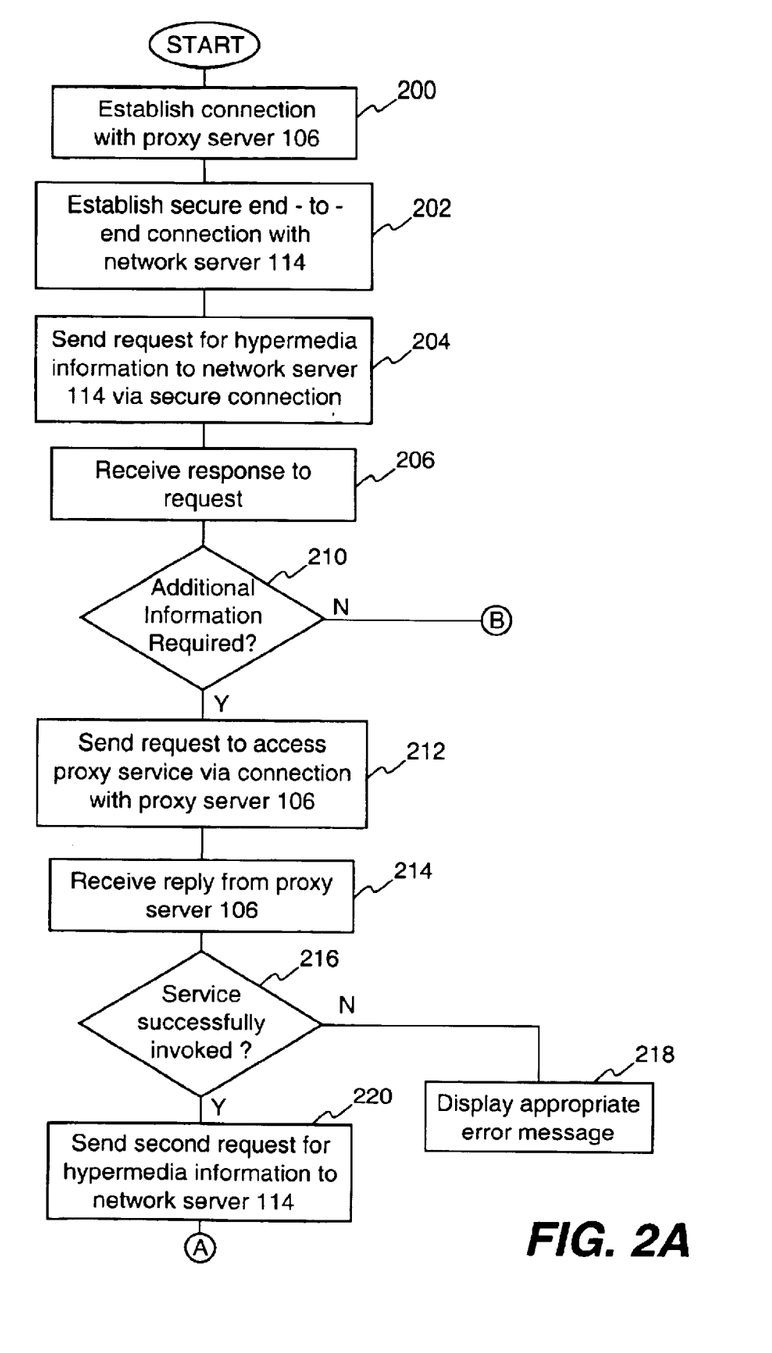
FIG. 2 shows a flow chart illustrating various steps performed by a communications device in a communication between the device and a network server, in accordance with one aspect of the invention.
Figure 2B:
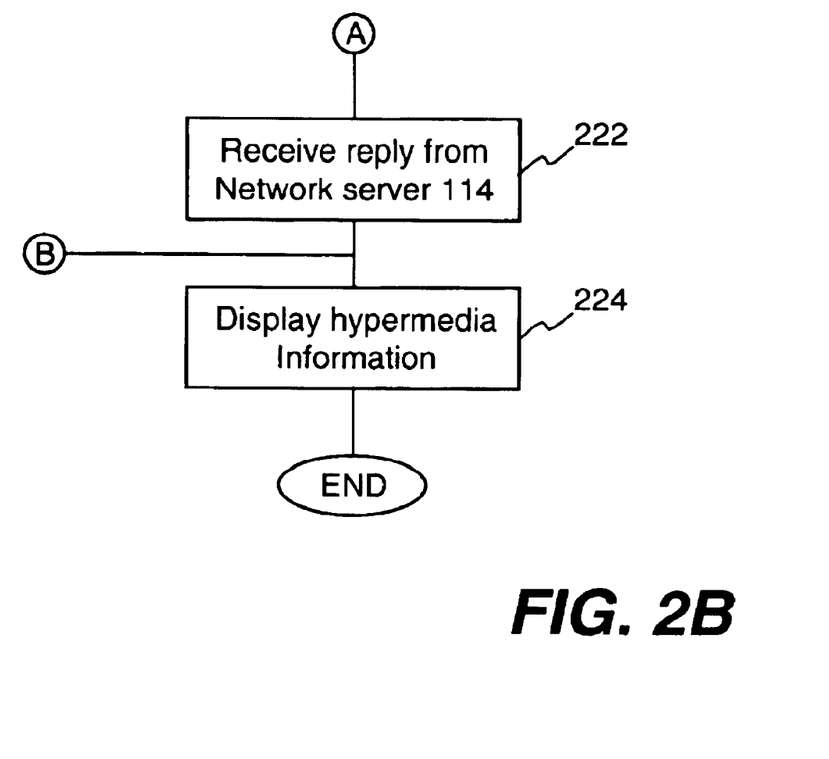

FIG. 2 shows a flow chart illustrating various steps in a communication between mobile telephone 150 and network server 114 in accordance with one aspect of the invention. At block 200, mobile telephone 150 establishes a connection with proxy server 106. This connection may be established using, for example, the HTTP or sHTTP protocols. At block 202, mobile telephone 150 establishes a secure end-to-end connection with network server 114. This secure end-to-end connection may be achieved using the TCP/IP protocol and tunneling through proxy server 106. At the end of block 202, mobile telephone 150 has two open sessions viz, a secure end-to-end session with network server 114 and either a secure or non-secure session with proxy server 106. At block 204 mobile telephone 150 sends a request for hypermedia information to network server 114 via the secure connection therewith. At block 206 mobile telephone 150 receives a response to the request. At block 210 the response is analyzed in order to make a determination as to whether additional information is required by network server 114 in order to service the request. If no additional information is required then at block 220 mobile telephone 150 displays the hypermedia information received from network server 114.

If it is determined that additional information is required, for example location information to access a "location" service as described, then mobile telephone 150 sends a request to proxy server 106 to access the appropriate proxy service at block 212. This request is sent via the connection established between the mobile telephone 150 and proxy server 106. At block 214 mobile telephone 150 receives a reply from proxy server 106. At block 216 a determination is made as to whether the proxy service was successfully invoked. If the appropriate service was not successfully invoked, for example if the service is not provided by the carrier of airnet 102, then at block 218, mobile telephone 150 displays an appropriate error message. If the service was successfully invoked then mobile telephone 150 sends a second request for the hypermedia information to network server 114 via the secure end-to-end connection at block 220. At block 222, mobile telephone 150 receives a reply to the second request from network server 114 and at block 224 mobile telephone 150 displays the hypermedia information.

Figure 3:
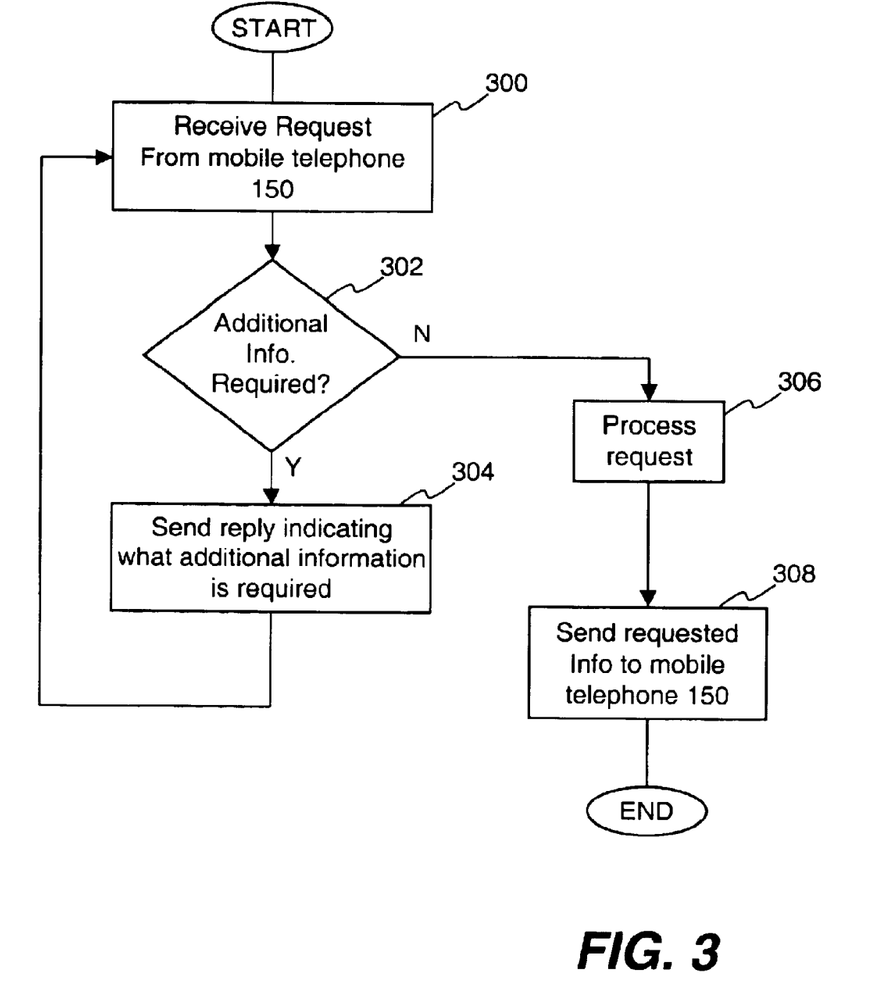
FIG. 3 shows a flow chart illustrating the operations performed by a network server in order to service a request by a communications device, in accordance with another embodiment of the invention.

In accordance with another aspect of the invention, network server 114 performs the operations depicted in FIG. 3. Referring to FIG. 3, at block 300 network server 114 receives a request for information from mobile telephone 150. At block 302 a determination is made as to whether additional information, for example the location of the mobile telephone 150, is needed from mobile telephone 150 in order to service the request. If it is determined that no additional information is required then at block 306 network server 114 processes the request and at block 308 the result of said processing is sent to mobile telephone 150. On the other hand, if it determined that additional information is required in order to service the request, then at block 304 a reply is sent to mobile telephone 150, the reply indicating what additional information is required. In accordance with the invention, the reply that is sent at block 304 is in a format which is understandable by proxy server 106. This saves on any computation that mobile telephone 150 has to make at block 212 in order to create a request to send to proxy server 106. By way of example, the reply that it sent at block 304 may be in the form of a simple error message for example, standard sHTTP error message "409" which is understandable by proxy server 106. In this case at block 212 mobile telephone 150 simply auto forwards the reply from network server 114 to the proxy server 106 for processing.

Figure 4:
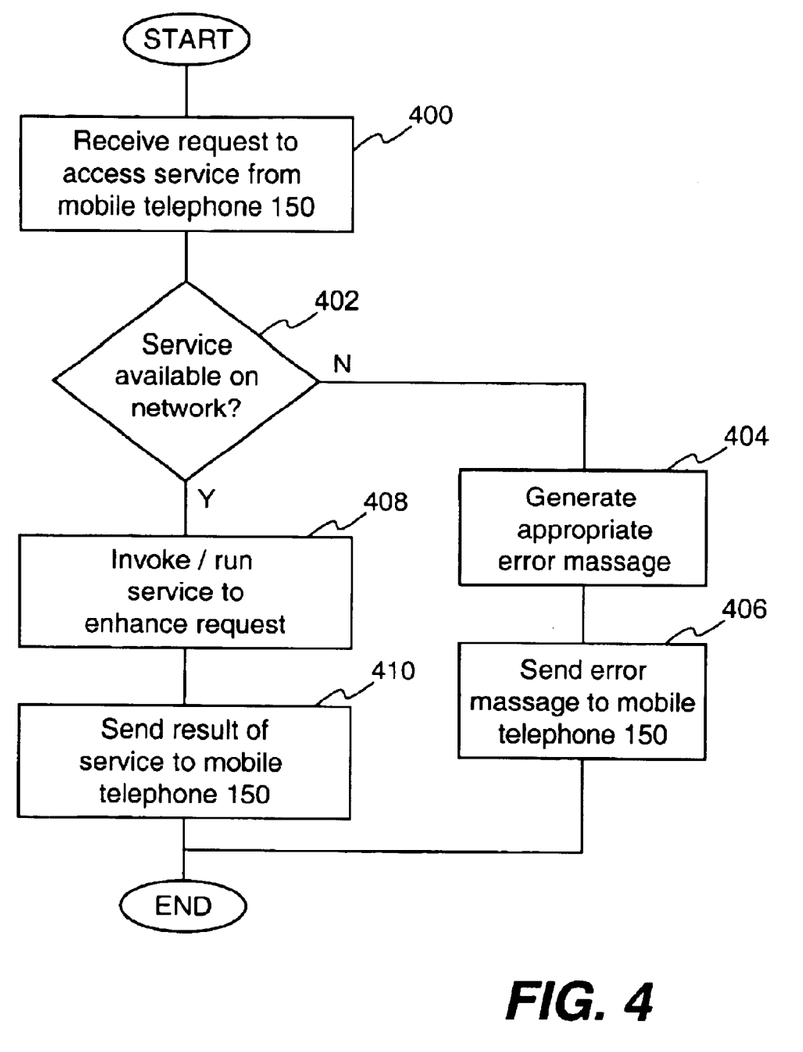
FIG. 4 shows a flow chart illustrating the operations performed by a proxy server in order to service a request by a communications device, in accordance with a further embodiment of the invention.

The operations performed by proxy server 106 in accordance with the invention are shown in FIG. 4 of the drawings. Referring to FIG. 4, at block 400 proxy server 106 receives, from mobile telephone 150, a request to access a particular proxy service. The proxy service may be a bookmarking service, a cookie caching service, a service to manage privacy agreements, a service to provide sub-id translations, a service to provide location or presence information, etc. At block 402, proxy server 106 determines whether the particular service requested is available on the network. If the service is not available then at block 404, an appropriate error message is generated and sent to mobile telephone 150 at block 406. If the requested service is available then the service is invoked by proxy server 106 at block 408 and at block 410 the result of the service is sent in the form of a reply to mobile telephone 150.

Figure 5:
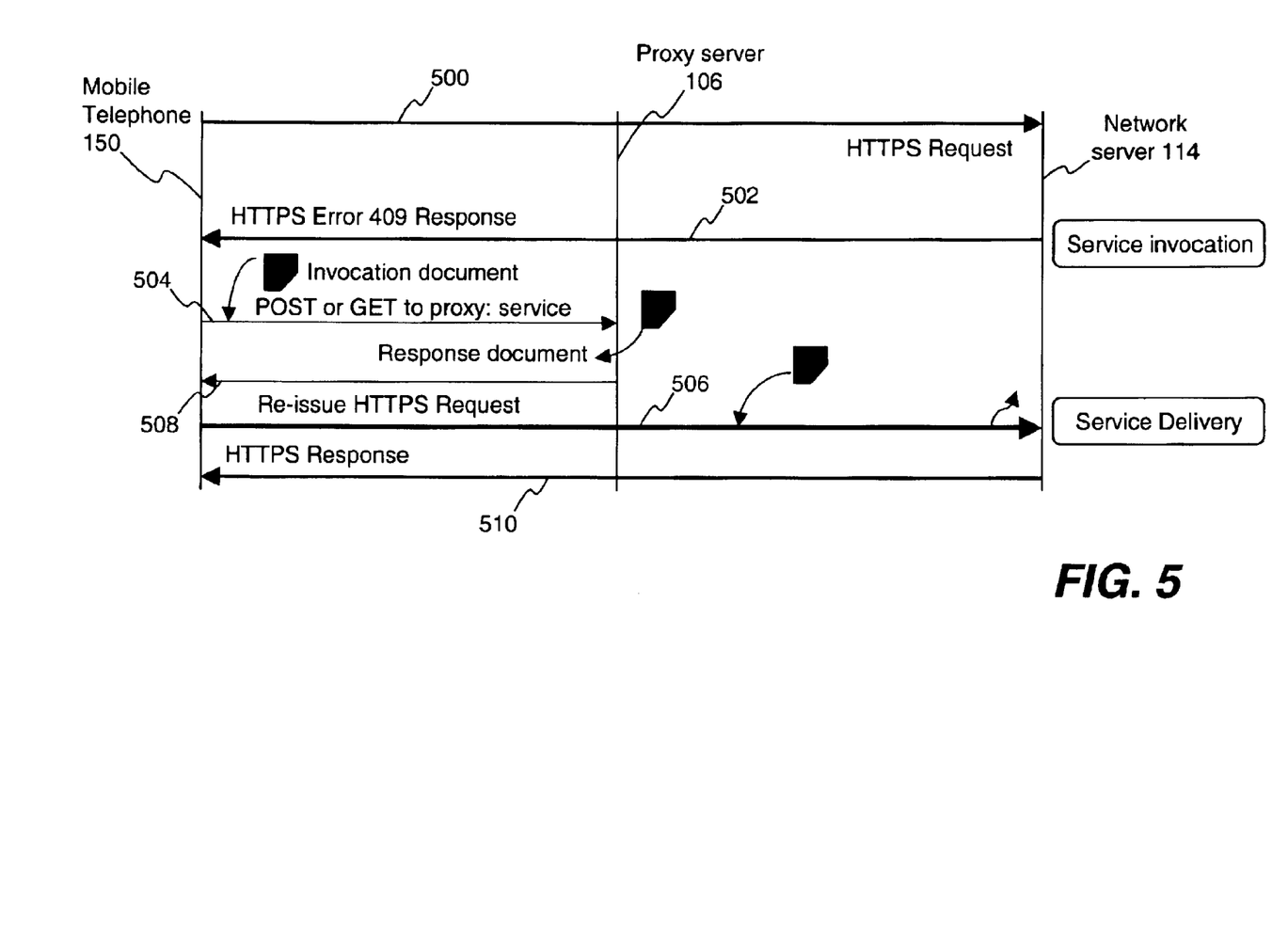
FIG. 5 shows a schematic drawing of an example of an end-to-end communications flow between a communications device and a network server, in accordance with the invention.

FIG. 5 shows one example of an end-to-end communication flow between mobile telephone 150 and network server 114. Referring to FIG. 5, an initial communication 500 is sent to the network server 114 by mobile telephone 150 via a secure end-to-end connection established therewith in accordance with the methodology described with reference to FIG. 2. The communication 500 is in the form of a secure sHTTP request. If in order to service the request 500, the network server 114 requires enhanced or extended information, for example, location or presence information, etc., then network server 114 responds by sending an error message 502 back to mobile telephone 150. As discussed, the error message 502 may be the standard HTTP error "409". Upon receipt of the error message 502, mobile telephone 150 sends a communication 504 to the proxy server 106 requesting processing of error message 502. Proxy server 106 services the request and sends a response document which includes the information required by network server 114 by way of a reply 506. Mobile telephone 150 receives the response document and reissues a HTTPs request 508, via the secure connection to network server 114. Network server 114 services the request 508 and an HTTP reply 510 is sent back to the mobile telephone 150 via the secure end-to-end connection.

Figure 6:
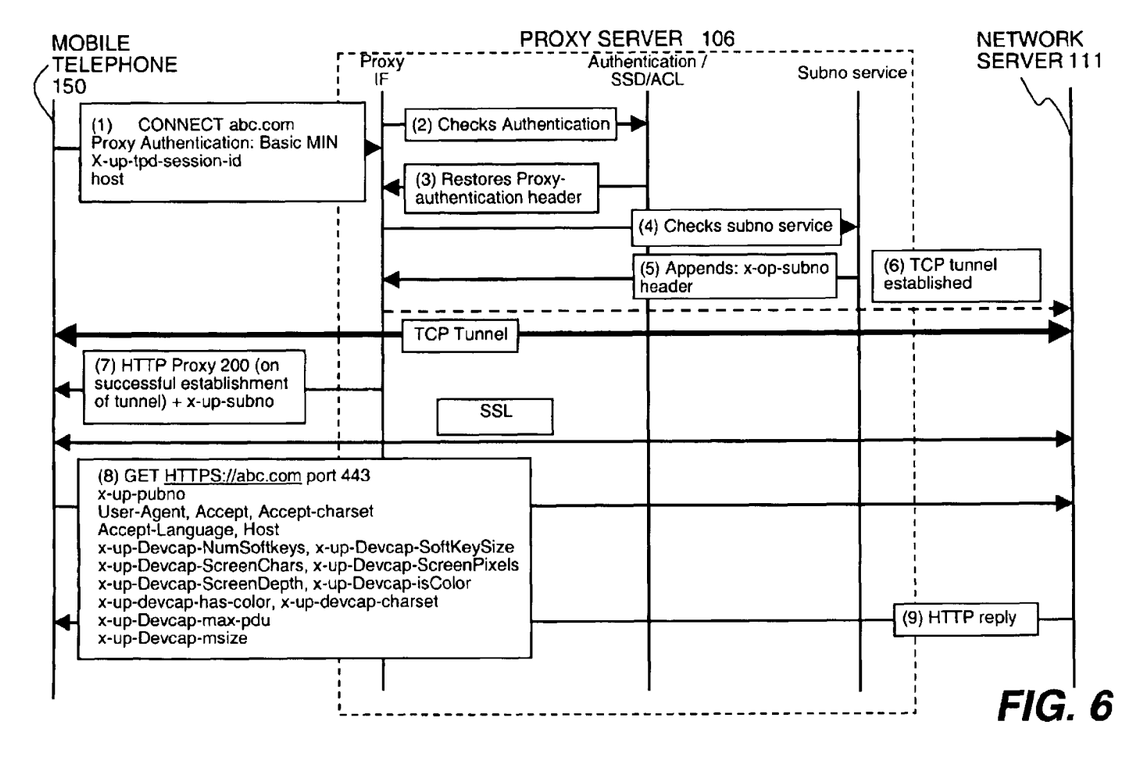
FIG. 6 shows a more detailed schematic drawing of the end-to-end communications flow shown in FIG. 5.

FIG. 6 of the drawings shows one example of an end-to-end communication flow of FIG. 5 in more detail. Referring to FIG. 6, at block 1 an initial request is made to proxy server 106. The request may include, among other things, a proxy-authorization HTTP header, a number of mandatory headers (user-agent, user charset, etc.) and any number of optional headers. At blocks 2 and 3 the request is passed to an authentication service in terms of which the proxy-authorization HTTP header is used to determine the existence of the particular subscriber. At blocks 4 and 5 the identity service is invoked to create a private temporary which is returned to mobile telephone 150 in the form of an HTTP response header. At block 6 proxy server 106, having detected the CONNECT method, establishes an end-to-end tunnel. This is done after having previously authenticated and checked to determine if such an end-to-end tunnel can be established. At block 7 upon successful establishment of the tunnel, proxy server 106 returns the Status 200 and a header containing the private identity is inserted into the response headers. Mobile telephone 150 may choose to send this header in a subsequent secure HTTP GET request to network server 114. At step 8 mobile telephone 150 sends a GET method using the secure HTTP scheme, with the appropriate headers, directly to network server 114. At step 9 network server 114 sends a HTTP reply directly back to mobile telephone 150.

Referring now to FIG. 6 of the drawings, the principle components of a mobile communications device in accordance with one embodiment of the invention, in the form of a mobile telephone 150, are shown schematically. The mobile telephone 150 includes a processor 152 which may be or include any of: a general-or-special purpose programmable microprocessor, Digital Signal Processor (DSP), Application Specific Integrated Circuits (ASIC), Programmable Logic Array (PLA), Field Programmable Gate Array (FBGA), etc., or a combination thereof. The mobile telephone 150 includes a Wireless Control Protocol (WCP) interface 154 that couples to a carrier network via airnet 102 to receive incoming and outgoing signals. Device identifier (ID) storage 156 stores and supplies to WCP interface 154 a device ID which identifies mobile phone 150 to outside entities (e.g. proxy server 106). The device ID is a specific code that is associated with mobile telephone 150 and directly corresponds to the device in the user account typically provided in an associated proxy server device, such as proxy server 106.

In addition, mobile telephone 150 includes memory 158 that stores data and/or software for performing many of the processing tasks performed by the mobile device 150 when executed by the processor 152. These tasks include: establishing a communications session with proxy server 106 via a wireless link to airnet 102; establishing a secure communications session with the network server 114 by tunneling through proxy server 106; requesting and receiving data from network server 114 and from the proxy server 106 via the carrier network; and displaying information on a display. Hence, memory 158 may represent one or more physical memory devices, which may include any type of Random Access Memory (RAM), Read-Only Memory (ROM), (which may be programmable), flash memory, non-volatile mass storage device, or a combination of such memory devices. Memory device 158 is also coupled to WCP interface 154 for the establishment of the communications sessions with network server 114 the proxy server 106 as described above. Mobile telephone 150 further includes a display 160 and a keypad 162. Mobile telephone 150 also includes voice circuitry 164 for inputting and outputting audio, and an encoder/decoder 166 coupled between processor 152 and voice circuitry 164 for encoding and decoding audio signals.

Figure 7:
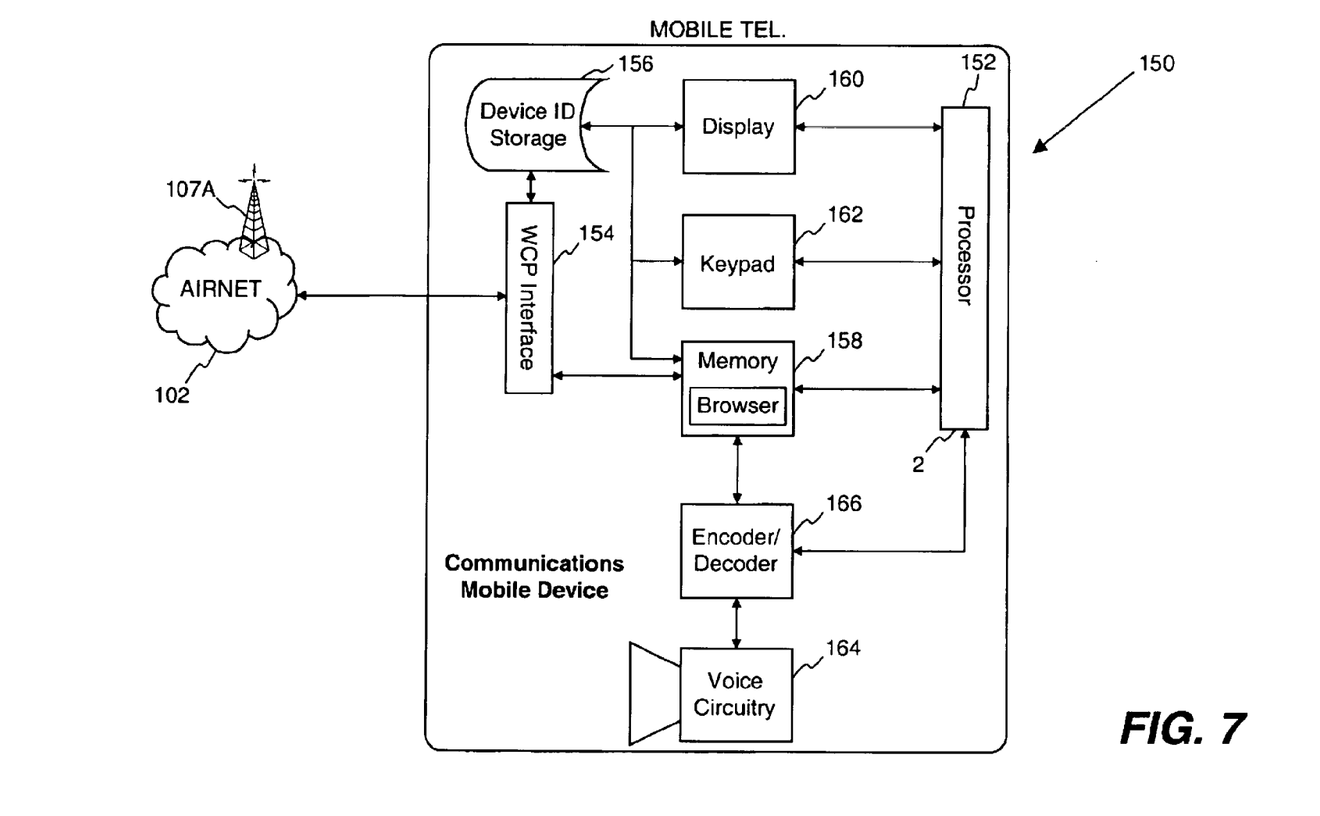
FIG. 7 shows a block diagram of a mobile communications device in accordance with the invention.

Referring now to FIG. 7 of the drawings reference numeral 106 generally indicates one embodiment of a proxy server in accordance with the invention. The proxy server 106 includes a memory device 252 which may represent one or more physical memory devices as described above with respect to mobile telephone 150. The proxy server 106 has loaded into the memory device 250 a proxy server application 254A and a gateway application 254B. The illustrated proxy server 106 further includes a disk drive 256, and a CD ROM drive 258 coupled to a peripheral device and user interface 264 via process bus 262. Processor 250, memory device 252, disk drive 256 and CD ROM 258 are generally known in the art.

The peripheral device and user interface 264 provides an interface between processor bus 262 and various components connected to a peripheral bus 270 as well as to user interface components such as display, keyboard, mouse, speakers, and other user interface devices. A wireless network interface 266, and landnet interface 268 are coupled to peripheral bus 270. Each of these interfaces 266, 268 may comprise a peripheral component card coupled to peripheral bus 270. The wireless network interface 266 couples proxy server 106 to airnet 102 illustrated in FIG. 1 of the drawings. The landnet interface 268 couples proxy server 106 to landnet 104 and operates according to the protocols as previously described. When executing program instructions written according to the principles of the present invention, proxy server 106 is able to perform the operations described in FIG. 3 of the drawings.

Figure 8:
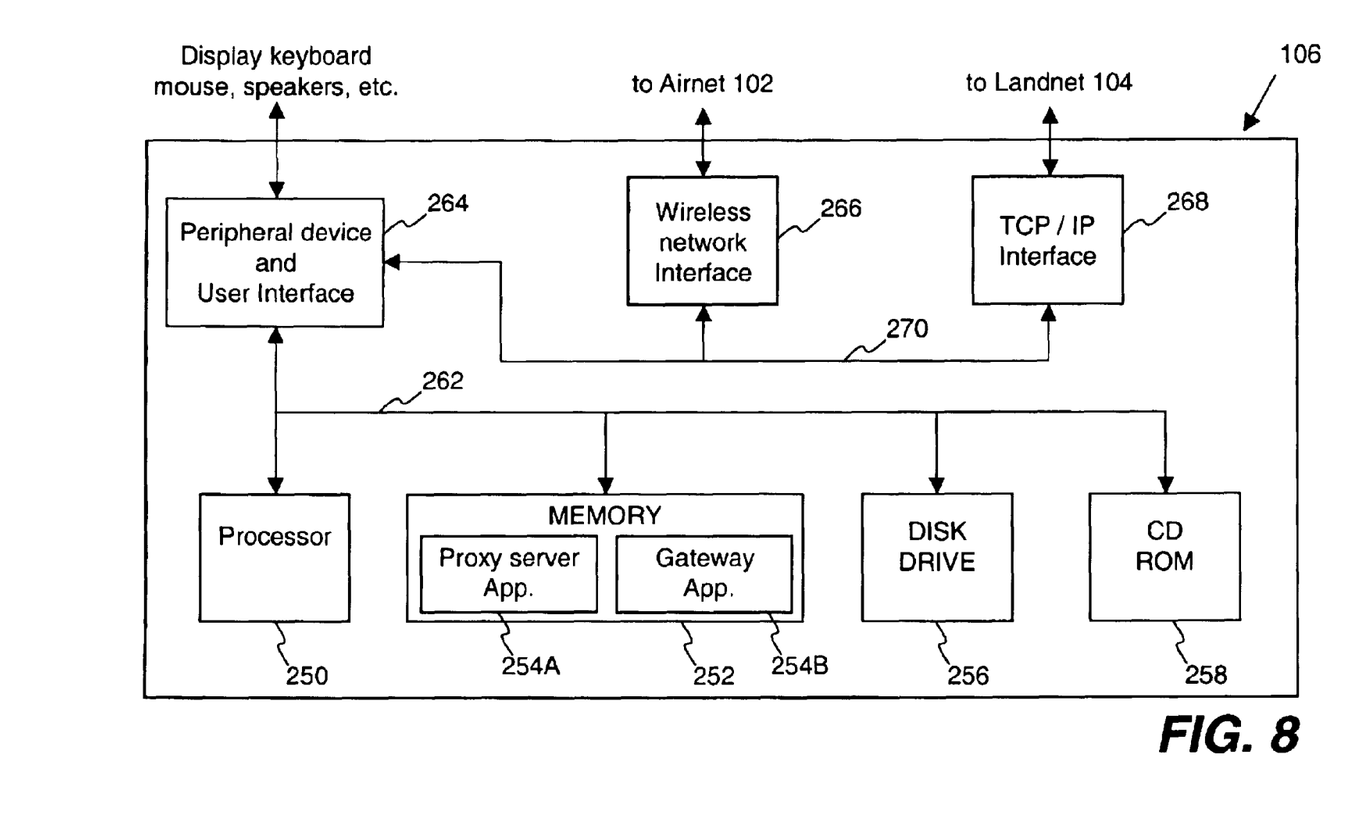
FIG. 8 shows a block diagram of a proxy server in accordance with the invention.
Figure 9:
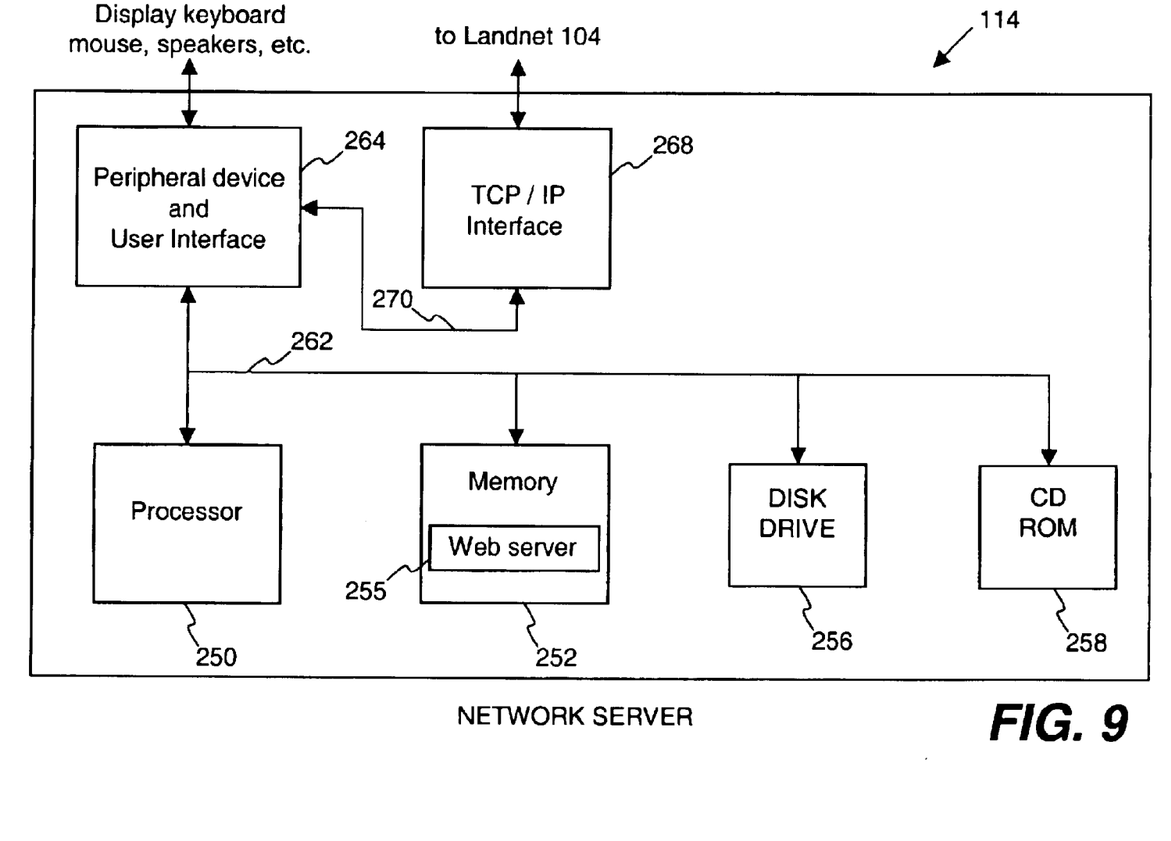
FIG. 9 shows a block diagram of a network server in accordance with the invention.

Referring to FIG. 8 of the drawings, reference the numeral 114 generally indicates a network server 114 in accordance with another aspect of the invention. The network server 114 includes similar components to the proxy server 106 and accordingly the same reference numerals have been used to indicate the same or similar components. A principle difference between the network server 114 and proxy server 106 is that memory device 252 includes a set of instructions 255 which when performed by the processor causes the proxy server to execute the methodology described with reference to FIG. 4 of the drawings. Furthermore, network server 114 does not have a wireless network interface.

In accordance with the method of the invention, various proxy services provided by a network carrier may be provisioned in a mobile communications device in accordance with the invention. Alternatively, the services may be discovered by the mobile communications device during a communications session with the proxy server 106 as described. This could be achieved by using a proxy: <service> URI scheme in which each additional service in the proxy would be identified by the <service> portion, for example, proxy: location. Alternatively, this could be done by using a single, proxy: URI scheme, for example proxy: service. Proxy server 106 will then be able to parse the incoming request from the mobile communications device and invoke the appropriate value added service.

One advantage of the present invention is that the provider of the hypermedia content stored on network server 114 only has to implement one protocol.

Another advantage is that the service provider who provides connectivity into airnet 102 is able to offer value added services from a centrally managed proxy server regardless of the security mechanism used in the underlying connection. This allows service providers to preserve business models and revenue showing opportunities, while still providing a true end-to-end secure service model.

Although the present has been described with reference to specific exemplary embodiments, it will be evident that various modifications and changes may be made to these embodiments without departing from the broader spirit of the invention as set forth in the claims. Accordingly, the specification and drawings are to be regarded in an illustrative sense rather than in a restrictive sense.

What is claimed is:

1. A method for a proxy server to provide a proxy server based service to a mobile communications device, the method comprising:
   receiving a request from the mobile communications device to access the proxy server based service;
   processing the request to access the proxy server based service; and
   sending a result of said processing the request to access the proxy server habed service to the mobile communications device for forwarding to a network server via a secure connection established between the mobile communications device and the network server, the secure connection-having been established by tunneling through the proxy server.

2. A method as claimed in claim 1, wherein the request is the form of a response previously generated by the network server in reply to a request by the mobile communications device to access an on-line service provided by the network server, the method then comprising providing a protocol to understand said response.

3. A proxy server comprising:
   a processor; and
   a memory device, having stored therein a code, which when executed by the processor causes the proxy server to:
   receive a request from a mobile communications device to a proxy server based service;

process the request to access the proxy server based service; and send a result of said processing the request to access the proxy server based service to the mobile communications device for forwarding to a network server via a secure connection established between the mobile communications device and the network server, the secure connection having been established by tunneling through the proxy server.

4. A proxy server as claimed in claim 3, wherein the code has portions which when executed perform a sequence of steps corresponding to a particular proxy service, the code further comprising instructions to execute a portion of the code corresponding to a particular proxy service based on the request from the mobile communications device.

5. A proxy server as claimed in claim 3, wherein the memory device further comprises a protocol stored therein to enable the processor to understand the request from the mobile communications device, in the event of said request being generated by an network server.

6. A proxy server as claimed in claim 3, wherein the secure connection is encrypted.

7. A method for a mobile communications device to access an on-line service provided by a network server, the method comprising:

establishing a first connection, between the mobile communications device and a proxy server, the proxy server being configured to provide a proxy based service to the mobile communications device;

establishing a second connection, between the mobile communications device and a network server, wherein the second connection is a secure connection that co-exists with the first connection, wherein the secure connection is established by encryption and tunneling through the proxy server;

sending a request for information from the mobile communications device to the network server via the secure connection;

receiving a reply to the request at the mobile communications device from the network serve, the reply being indicative of additional information required by the network server to process the request;

using the first connection to access the proxy server based service, the service being able to provide the additional information;

receiving the additional information at mobile communications device from the proxy server via the first connection; and sending a second request from the mobile communications device to the network server via the second connection, the second request including the additional information.

8. A method for a proxy server to provide a proxy based service to a mobile communications device, the method comprising:

receiving at the proxy server a request from the mobile communications device to access the proxy server based service;

processing the request in the proxy server by generating a response including information provided by the proxy server based service, the information being required by a network server in order to service a request sent by the mobile communications device via a secure connection between the mobile communications device and the network server, the secure connection having been established by encryption and tunneling through the proxy server; and sending the response to the mobile communications device.

9. A method for a proxy server to provide a proxy based service to a mobile communications device, the method comprising:

maintaining a first connection between the proxy server and the mobile communications device;

maintaining a second connection between the mobile communications device and a network server concurrently with maintaining the first connection, wherein the second connection is a secure connection implemented by a tunnel through the proxy server;

receiving at the proxy serve, via the first connection, a first request from the mobile communications device to access a service provided by the proxy server, the request being for information required by the network server to allow the network server to service a second request previously sent by the mobile communications device to the network server via the second connection;

generating a response to the first request in the proxy server, the response including said information required by the network server; and sending the response to the mobile communications device via the first connection.

10. A method as claimed in claim 9, wherein the second connection is encrypted.

* * * * *

UNITED STATES PATENT AND TRADEMARK OFFICE
CERTIFICATE OF CORRECTION

PATENT NO. : 7,099,917 B2  Page 1 of 1
APPLICATION NO. : 09/838077
DATED : August 29, 2006
INVENTOR(S) : Luna et al.

It is certified that error appears in the above-identified patent and that said Letters Patent is hereby corrected as shown below:

In Column 8, line 51, please replace "server habed service" with --server based service.--.

Signed and Sealed this

Fifth Day of December, 2006

JON W. DUDAS
*Director of the United States Patent and Trademark Office*